(12) United States Patent
Jiang

(10) Patent No.: US 11,995,014 B2
(45) Date of Patent: May 28, 2024

(54) BUS EXCEPTION HANDLING METHOD AND APPARATUS, ELECTRONIC DEVICE AND READABLE STORAGE MEDIUM

(71) Applicant: INSPUR SUZHOU INTELLIGENT TECHNOLOGY CO., LTD., Jiangsu (CN)

(72) Inventor: Bo Jiang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/271,658

(22) PCT Filed: Oct. 29, 2021

(86) PCT No.: PCT/CN2021/127330
§ 371 (c)(1),
(2) Date: Jul. 10, 2023

(87) PCT Pub. No.: WO2023/024248
PCT Pub. Date: Mar. 2, 2023

(65) Prior Publication Data
US 2024/0037049 A1 Feb. 1, 2024

(30) Foreign Application Priority Data

Aug. 27, 2021 (CN) .......................... 202110991790.4

(51) Int. Cl.
*G06F 13/36* (2006.01)
(52) U.S. Cl.
CPC ...... *G06F 13/36* (2013.01); *G06F 2213/0022* (2013.01)

(58) Field of Classification Search
None
See application file for complete search history.

(56) References Cited

U.S. PATENT DOCUMENTS 5,872,936 A * 2/1999 Eckstein ............... G06F 13/364
348/94
10,623,203 B2 * 4/2020 Seifert ............. H04L 12/40169
(Continued)

FOREIGN PATENT DOCUMENTS

CN 1335563 A 2/2002
CN 102521061 A 6/2012
(Continued)

OTHER PUBLICATIONS

International Search Report for PCT/CN2021/127330 dated May 26, 2022 (6 pages including English Translation).
(Continued)

*Primary Examiner* — Elias Mamo
(74) *Attorney, Agent, or Firm* — Merchant & Gould P.C.

(57) ABSTRACT

Provided are a bus exception handling method and apparatus, an electronic device and a computer-readable storage medium. The method includes: respectively obtaining, from multiple target buses, multiple pieces of target data corresponding to the multiple target buses, where the multiple target buses include a master bus and one or more candidate buses, and the target data corresponding to the master bus is referred to as first data; determining whether the first data satisfies a bus exception condition, where the bus exception condition is a data bus marker exception condition or a data content exception condition; and in response to determining that the first data satisfies the bus exception condition, selecting a target candidate bus in a healthy state as a new master bus, and updating local bus data.

20 Claims, 3 Drawing Sheets

(56) References Cited

U.S. PATENT DOCUMENTS

| | | | |
|---|---|---|---|
| 2005/0177663 A1* | 8/2005 | Jeong | G06F 13/362 710/110 |
| 2007/0016308 A1* | 1/2007 | Kusumi | G05B 19/0421 700/20 |
| 2007/0101032 A1* | 5/2007 | Nara | G06F 13/364 710/110 |
| 2010/0153610 A1* | 6/2010 | Kawashima | G06F 13/364 710/308 |
| 2013/0155794 A1 | 6/2013 | Wu et al. | |

FOREIGN PATENT DOCUMENTS

| | | |
|---|---|---|
| CN | 202737901 U | 2/2013 |
| CN | 106027351 A | 10/2016 |
| CN | 113434354 A | 9/2021 |
| JP | 2001062125 A | 3/2001 |

OTHER PUBLICATIONS

Written Opinion for PCT/CN2021/127330 dated May 26, 2022 (4 pages).
Chinese Search Report for Application No. 2021109917904 dated Sep. 28, 2021 (2 pages).

* cited by examiner

BUS EXCEPTION HANDLING METHOD AND APPARATUS, ELECTRONIC DEVICE AND READABLE STORAGE MEDIUM

CROSS-REFERENCE TO RELATED APPLICATION

This application is a National Stage Application of International Application No. PCT/CN2021/127330, filed 29 Oct. 2021, which claims benefit of Serial No. 202110991790.4, filed 27 Aug. 2021 in China, and which applications are incorporated herein by reference. To the extent appropriate, a claim of priority is made to each of the above disclosed applications.

TECHNICAL FIELD

The present disclosure relates to the field of controller technologies, and particularly relates to a bus exception handling method, a bus exception handling apparatus, an electronic device and a computer-readable storage medium.

BACKGROUND

In order to ensure data security and improve performance of disaster tolerance, dual-control and quadruple-control architecture solutions, for example, one-chassis dual-control and one-chassis quadruple-control configuration solutions, have been provided. Service performance is considerably improved by handling services by multiple controllers. Moreover, once a certain controller suddenly breaks down, another controller can take over the services of the broken controller, which substantially improves data security and performance of disaster tolerance of a device. The one-chassis quadruple-control configuration solution is to equip one chassis with four controller motherboards. A master controller is required to be elected from multiple controllers, and data is required to be synchronized between the multiple controllers, so as to ensure that the device can provide the services to the outside by means of the multiple controllers. Currently, a communication exception frequently occurs between the controllers. If all the controllers are in poor communication with each other, multiple master controllers may be elected, resulting in "split-brain" of upper software or causing data inconsistency.

SUMMARY

In view of the above problem, embodiments of the present disclosure provide a bus exception handling method, a bus exception handling apparatus, an electronic device and a computer-readable storage medium, which may avoid "split-brain" of upper software and ensure data consistency.

In order to solve the above technical problem, the embodiments of the present disclosure provide a bus exception handling method. The method includes:
  respectively obtaining, from multiple target buses, multiple pieces of target data corresponding to the multiple target buses, where the multiple target buses include a master bus and one or more candidate buses, and the target data corresponding to the master bus is referred to as first data;
  determining whether the first data satisfies a bus exception condition, where the bus exception condition is a data bus marker exception condition or a data content exception condition; and
  in response to determining that the first data satisfies the bus exception condition, selecting a target candidate bus in a healthy state as a new master bus and updating local bus data.

In some exemplary embodiments, when the bus exception condition is the data content exception condition, determining whether the first data satisfies the bus exception condition includes:
  determining whether the first data is consistent with target second data, where the one or more pieces of target data corresponding to the one or more candidate buses are referred to as second data, and the target second data is at least one piece of the second data;
  in response to determining that the first data is inconsistent with the target second data, determining whether a bus variable is in an exceptional state; and
  determining that the first data satisfies the data content exception condition when the bus variable is in the exceptional state.

In some exemplary embodiments, the bus variable is a link exception variable, and determining whether the bus variable is in the exceptional state includes:
  monitoring the master bus for a preset duration to obtain a monitoring result, where the preset duration is longer than a single frame length; and
  determining that the link exception variable is in the exceptional state when the monitoring result is all zeros or all ones.

In some exemplary embodiments, the bus variable is a check exception variable, and determining whether the bus variable is in the exceptional state includes:
  counting target bits in the first data to obtain a counting result;
  updating the check exception variable in response to determining that the counting result does not match check data in the first data; and
  determining that the check exception variable is in the exceptional state when the check exception variable is greater than a first threshold.

In some exemplary embodiments, the bus variable is a type exception variable, and determining whether the bus variable is in the exceptional state includes:
  extracting type data of a frame type field from the first data;
  updating the type exception variable in response to determining that the type data does not belong to standard type data; and
  determining that the type exception variable is in the exceptional state when the type exception variable is greater than a second threshold.

In some exemplary embodiments, when the bus exception condition is the data bus marker exception condition, determining whether the first data satisfies the bus exception condition includes:
  extracting current bus marker data from the first data; and
  determining that the first data satisfies the data bus marker exception condition when the current bus marker data does not match the local bus data.

In some exemplary embodiments, the method further includes: writing the target data into a target caching location in response to determining that the first data does not satisfy the bus exception condition; and
  after determining that the first data satisfies the bus exception condition, emptying the target caching location and reporting an exception when there is no target candidate bus in the healthy state.

The embodiments of the present disclosure further provide a bus exception handling apparatus. The apparatus includes:

an obtaining module, configured to respectively obtain, from multiple target buses, multiple pieces of target data corresponding to the multiple target buses, where the multiple target buses include a master bus and one or more candidate buses, and the target data corresponding to the master bus is referred to as first data;

a determining module, configured to determine whether the first data satisfies a bus exception condition, where the bus exception condition is a data bus marker exception condition or a data content exception condition; and a bus updating module, configured to, in response to determining that the first data satisfies the bus exception condition, select a target candidate bus in a healthy state as a new master bus and update local bus data.

The embodiments of the present disclosure further provide an electronic device. The electronic device includes a memory and one or more processors, where the memory stores a computer-readable instruction, and the computer-readable instruction enables the one or more processors to execute operations of the bus exception handling method in the above embodiment when executed by the one or more processors.

The embodiments of the present disclosure further provide one or more non-transitory computer-readable storage media storing a computer-readable instruction. The computer-readable instruction enables one or more processors to execute operations of the bus exception handling method in the above embodiment when executed by the one or more processors.

According to the bus exception handling method provided in the embodiments of the present disclosure, multiple pieces of target data corresponding to multiple target buses are respectively obtained from the multiple target buses, where the multiple target buses include a master bus and one or more candidate buses, and the target data corresponding to the master bus is referred to as first data; whether the first data satisfies a bus exception condition is determined, where the bus exception condition is a data bus marker exception condition or a data content exception condition; and in response to determining that the first data satisfies the bus exception condition, a target candidate bus in a healthy state is selected as a new master bus and local bus data is updated.

It can be seen that in the embodiments of the present disclosure, one master bus and one or more candidate buses are arranged between controllers, and data communication is carried out by means of the at least two buses. In the method, target data obtained from the master bus is referred to as first data, whether an exception occurs on the master bus may be determined according to the first data, that is, whether the first data satisfies a bus exception condition may be determined, so as to determine whether poor communication occurs during control. The bus exception condition may be a data bus marker exception condition, that is, whether an exception occurs on a bus marker in the first data may be determined; alternatively, the bus exception condition may be a data content exception condition, that is, whether an exception occurs on data content of the first data may be determined. Under the condition that any one of the above conditions is satisfied, it is indicated that the first data obtained from the master bus is not data sent by an original controller, and it may be further determined that an exception occurs on the master bus, which may lead to poor communication between controllers. In order to avoid "split-brain" of upper software or data inconsistency, after determining that the first data satisfies the bus exception condition, a target candidate bus in a healthy state is selected as a new master bus, such that the master bus is replaced. Moreover, the local bus data is updated, so as to indicate that an exception occurs on the old master bus. By changing a master bus identity, and selecting a healthy (that is, normal) target candidate bus as the new master bus, communication may be carried out always by means of a bus in a normal state. Therefore, smooth communication between controllers may be ensured, "split-brain" of the upper software may be avoided, and data consistency may be ensured.

In addition, the embodiments of the present disclosure further provide a bus exception handling apparatus, an electronic device and a computer-readable storage medium, which also have the above beneficial effects.

Details of one or more embodiments of the present disclosure are set forth in the following accompanying drawings and description. Other features and advantages of the present disclosure will become apparent from the description and accompanying drawings and from the claims.

BRIEF DESCRIPTION OF THE DRAWINGS

In order to illustrate technical solutions in embodiments of the present disclosure or in the related art more clearly, accompanying drawings required to be used in the description of the embodiments or the related art will be briefly introduced below. Apparently, the accompanying drawings in the following description only show the embodiments of the present disclosure, and those having ordinary skill in the art would have derived other accompanying drawings according to these provided accompanying drawings without involving any inventive effort.

DETAILED DESCRIPTION

In order to make objectives, technical solutions and advantages of embodiments of the present disclosure clearer, technical solutions in embodiments of the present disclosure will be clearly and completely described below in combination with accompanying drawings in the embodiments of the present disclosure. Apparently, the described embodiments are some embodiments rather than all embodiments of the present disclosure. Based on embodiments of the present disclosure, all other embodiments obtained by those having ordinary skill in the art without involving any inventive effort shall fall within the scope of protection of the present disclosure.

Figure 1:
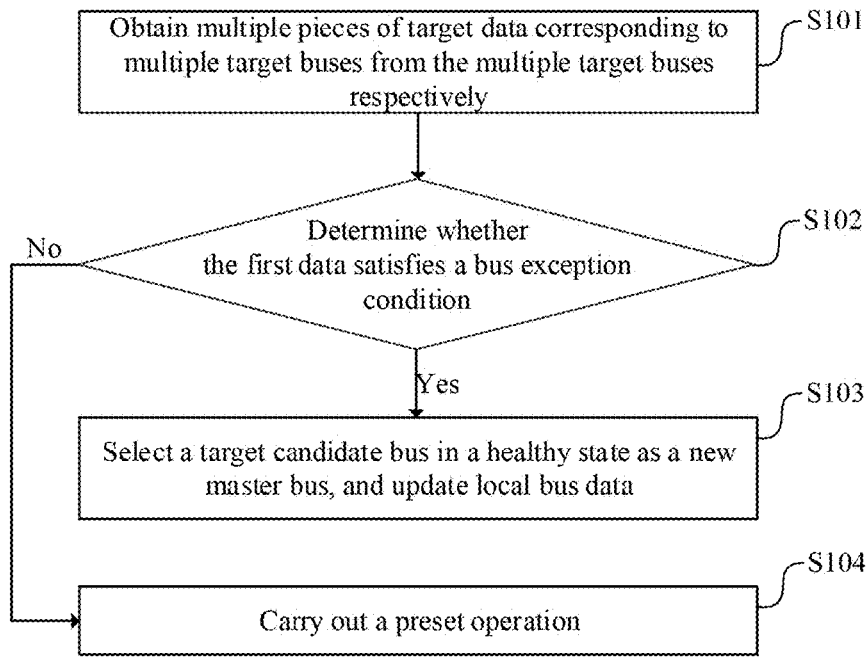
FIG. 1 is a flowchart of a bus exception handling method according to one or more embodiments of the present disclosure.

With reference to FIG. 1, a flowchart of a bus exception handling method according to one or more embodiments of the present disclosure is shown in FIG. 1. The method includes the following operations S101 to S104.

In operation S101, multiple pieces of target data corresponding to multiple target buses are respectively obtained from the multiple target buses.

Some operations or all operations in the embodiments of the present disclosure may be executed by any one of controllers within a frame. The multiple target buses include a master bus and one or more candidate buses, and the target data corresponding to the master bus is referred to as first data. Data content and data types of the target data may be in various forms. For example, the target data may be a data synchronization broadcast command, data content of which is data to be synchronized, a request synchronization command, data content of which is unique identity information of a designated node, or taking leadership information for competing for a master node identity.

It should be noted that the target data is sent to all the target buses after being generated by a controller. Under the condition that all the target buses are in normal states, all other controllers may obtain the target data from target buses, discard the target data other than the first data, and execute corresponding instructions according to the first data. Types of the candidate buses may be the same as or different from a type of the master bus.

Figure 2:
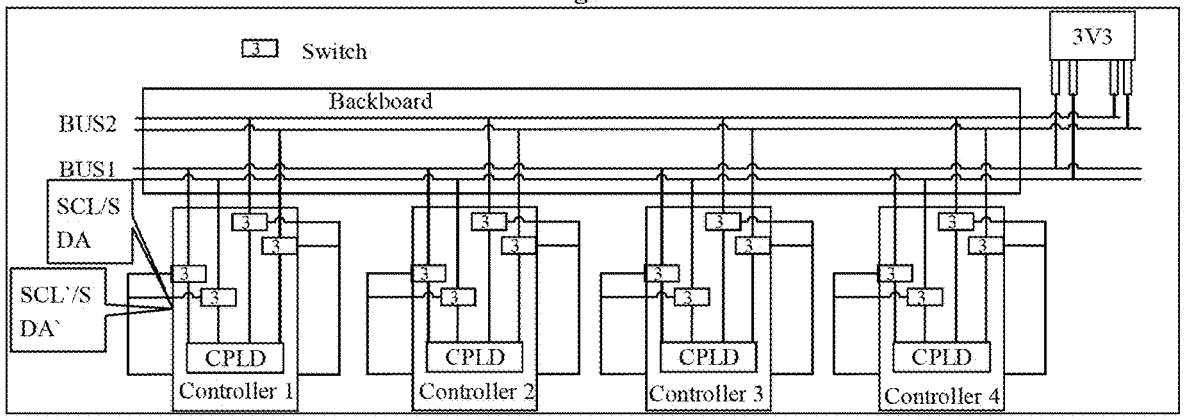
FIG. 2 is a diagram of a connection structure of controllers according to one or more embodiments of the present disclosure.

A generation method for various types of target data is not limited in the embodiments. It can be understood that during operation, the controllers generally carry out certain operations such as competing for a master controller identity and synchronizing data. With reference to FIG. 2, a diagram of a connection structure of controllers according to one or more embodiments of the present disclosure is shown in FIG. 2. Complex programmable logic devices (CPLDs) on four controllers (controller 1, controller 2, controller 3 and controller 4) are interconnected to bus 1 and bus 2 by means of a backboard. Switches are arranged on the backboard. In some exemplary implementations, a switch may be a switch chip or a Metal-Oxide-Semiconductor (MOS) transistor (which is an abbreviation of Metal-Oxide-Semiconductor Field-Effect Transistor (MOSFET)) and is controlled by the CPLDs. After controller motherboards are plugged in place, the CPLDs turn on the switch chips (or the MOS transistors), so as to prevent current surge of hot-plug controllers from disturbing other controllers in communication with each other on the buses. In addition, pull-up resistors and power supplies are arranged on the motherboards, controller boards employ open-drain output modes, bus 1 and bus 2 may take Inter-Integrated Circuits (IICs) as prototypes, and two data lines of each bus are a serial clock line and a serial data line (that is, an SCL and an SDA or an SCL' and an SDA') respectively.

Figure 3:
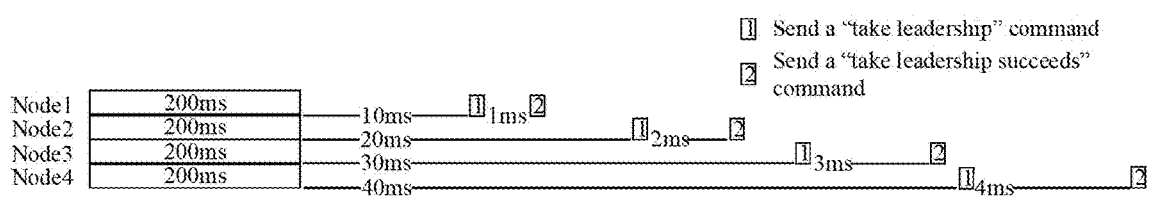
FIG. 3 is a sequence diagram of a master node election process according to one or more embodiments of the present disclosure.

With the structure shown in FIG. 2 as an instance, a master controller election process is illustrated below. With reference to FIG. 3, a sequence diagram of a master node election process according to one or more embodiments of the present disclosure is shown in FIG. 3. When a CPLD detects that the serial clock line or the serial data line of the bus has a level change, the CPLD determines that the bus is in a non-idle state. Under the condition that the non-idle state lasts for more than 200 ms, the CPLD considers that a current bus does not have a "master", that is, there is no master controller among all the controllers. In this case, each CPLD starts a first timer (node code*10 ms) according to its own node code. After timing of the first timer is over, a "taking leadership" command is sent on each bus. Then, a second timer (node code*1 ms) is started. Under the condition that it is found that no bus is in a non-idle state during timing of the second timer, taking leadership succeeds, and a "taking leadership succeeds" command is sent.

It should be noted that specific content of the above commands is not limited in the embodiments. In an exemplary implementation, formats and content of various commands may be as shown in a table as follows:

|  | Start bit | Frame type | Address of sending device | Address of receiving device | Data (random length, 48 bit) | Cyclic redundancy check (CRC) | Stop bit |
|---|---|---|---|---|---|---|---|
| Taking four leadership | start | 8' haa | 8' b0000 + last four digits of device identification (ID) number | 8' b0000_0000 (broadcast) |  | 8 'b-sum of all ones | stop |
| Taking leadership succeeds | start | 8' ha5 | 8' b0000 + last four digits of device ID number | 8' b0000_0000 (broadcast) |  | 8 'b-sum of all ones | stop |
| Request synchronization | start | 8' h55 | 8' b0000 + last four digits of device ID number | 8' b0000_ + last four digits of device ID number |  | 8 'b sum of all ones | stop |
| Data synchronization | start | 8' h5a | 8' 60000 + last four digits of device ID number | 8' b0000_0000 (broadcast) | data | 8 'b-sum of all ones | stop |

-continued

| | Start bit | Frame type | Address of sending device | Address of receiving device | Data (random length, 48 bit) | Cyclic redundancy check (CRC) | Stop bit |
|---|---|---|---|---|---|---|---|
| Refresh Baseboard Manager Controller (BMC) read buf | start | 8' ha7 | 8' b0000 + last four digits of device ID number | 8' b0000_0000 (broadcast) | | 8 'b sum of all ones | stop |

Figure 4:
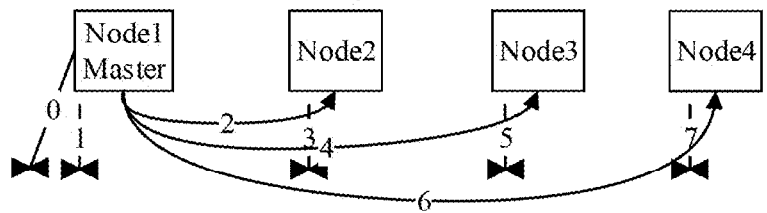
FIG. 4 is a flowchart of node communication operations according to one or more embodiments of the present disclosure.

After taking leadership succeeds, data synchronization may be carried out. With reference to FIG. 4, a flowchart of node communication operations according to one or more embodiments of the present disclosure is shown in FIG. 4. The operations include the following operations 0 to 7.

In operation 0, a master node (herein a node refers to a controller) sends out an "upload broadcast command". All nodes simultaneously obtain synchronization data of 4 nodes (including themselves) collected by "receive buffers" and update the data into their own "BMC read buffers", so as to ensure data consistency of all the nodes. Afterwards, the "receive buffers" are emptied.

In operation 1, the master node sends out a "data synchronization broadcast command" to broadcast key information "abcdef" (a simple instance) of its own controller motherboard. Moreover, the master node stores the data in its own "receive buffer". After monitoring the "data synchronization broadcast command", the other three nodes store key information "abcdef" sent out from the master node in their own "receive buffers".

In operation 2, the master node sends out a "request synchronization command" for node 2, and then enters a passive monitoring state.

In operation 3, node 2 sends out a "data synchronization broadcast command" after receiving the "request synchronization command", and broadcasts key information "abcdef" (a simple instance) of its own controller motherboard. Moreover, node 2 stores the data in its own "receive buffer". After monitoring the "data synchronization broadcast command", the other three nodes store key information "abcdef" sent out from node 2 in their own "receive buffers".

Operations 4-7 are similar to operations 2 and 3, and the master node traverses nodes 3 and 4. According to the above process, it can be seen that in a read/write cycle, a process that a slave node (that is, a non-master controller) replies to a master node (that is, a master controller) with Acknowledge characters (ACKs) is canceled, switching of sda driving right is canceled, reliability may be improved, and a probability that a bus hangs may be reduced.

It should be noted that in the above process, any information sent by any controller is required to be sent on all target buses.

In operation S102, whether the first data satisfies a bus exception condition is determined.

Since the first data is obtained from the master bus, by determining whether the first data satisfies the bus exception condition, whether an exception occurs on the master bus currently recorded by the controller may be determined. When it is determined that the bus exception condition is satisfied, it is considered that the master bus may not correctly transmit data. In order to avoid the problems of "split-brain" of upper software and data asynchronization caused by an incapability of normal communication with other controllers for a long time, operation S103 may be executed, and otherwise, operation S104 may be executed.

In the embodiments of the present disclosure, the bus exception condition is a data bus marker exception condition or a data content exception condition. The data bus marker exception condition refers to a condition indicating that an exception occurs on a bus marker in the first data. The data content exception condition refers to a condition indicating that an exception occurs on data content of the first data. Through the above two exception conditions, whether an exception occurs on the master bus may be illustrated based on the two aspects of the bus marker of the first data and the data content of the first data.

In an exemplary implementation, when the bus exception condition is the data content exception condition, the process of determining whether the first data satisfies the bus exception condition may include the following operations 11 to 13.

In operation 11, whether the first data is consistent with target second data is determined.

In operation 12, in response to determining that the first data is inconsistent with the target second data, whether a bus variable is in an exceptional state is determined.

In operation 13, when the bus variable is in the exceptional state, it is determined that the first data satisfies the data content exception condition.

In the embodiments, the one or more pieces of target data corresponding to the one or more candidate buses are referred to as second data, and the target second data is at least one piece of the second data. That is, after the first data and the second data are obtained, one or more pieces of target second data are determined from the one or more pieces of second data, and each piece of target second data is compared with the first data, so as to determine whether the first data is consistent with each piece of target second data. Since a probability that exception occurs on more than two buses at the same time is almost zero, it is considered that the situation that the first data and the target second data both are exceptional data may not occur. Therefore, under the condition that the first data is inconsistent with the at least one piece of target second data, it is considered that an exception may occur on the first data. In this case, in order to accurately determine whether an exception occurs on the master bus, whether the bus variable is in an exceptional state may be determined. When the bus variable is in the exceptional state, it is determined that the first data satisfies the data content exception condition.

The bus variable refers to a variable describing a working condition of the master bus, and a specific type and quantity of the bus variable are not limited. For example, the bus variable may be a link exception variable, a check exception variable and a type exception variable. It can be understood that different types of bus variables may indicate that different types of exceptions occur on the master bus, and the more the bus variables, the more aspects the master bus may be monitored from. A specific method for determining whether the bus variable is in an exceptional state is not limited in the embodiments. In an embodiment, under the condition that the bus variable is the link exception variable, the process of determining whether the bus variable is in the exceptional state includes the following operations 21 and 22.

In operation 21, the master bus is monitored for a preset duration to obtain a monitoring result.

In operation 22, when the monitoring result is all zeros or all ones, the link exception variable is set in an exceptional state, that is, it is determined that the link exception variable is in the exceptional state.

Since when a physical link breaks down, for example, after a switch in FIG. 2 breaks down, the link is completely connected to or disconnected from a 3V3 power supply. In this case, whether an exception occurs on the physical link may be determined by monitoring the master bus. In some exemplary implementations, it is required to monitor the master bus for a preset duration to obtain the monitoring result, and the preset duration is longer than a single frame length, so as to avoid the situation that there happens to be all-zero or all-one signals on the bus during monitoring. Under the condition that the monitoring result is all zeros or all ones, it is indicated that the physical link breaks down. In this case, the link exception variable may be set in an exceptional state, and it is monitored that the link exception variable is in the exceptional state.

In another embodiment, under the condition that the bus variable is the check exception variable, the process of determining whether the bus variable is in the exceptional state includes the following operations 31 to 33.

In operation 31, target bits in the first data are counted to obtain a counting result.

In operation 32, the check exception variable is updated in response to determining that the counting result does not match check data in the first data.

In operation 33, it is determined that the check exception variable is in the exceptional state when the check exception variable is greater than a first threshold.

The target bit refers to a preset bit serving as a monitoring standard, for example, 0 bit or 1 bit. Since the master bus is affected by signal interference and other factors, data transmitted on the master bus may change, and bits in the data may be changed, for example, from 0 bit to 1 bit. Therefore, by counting bits in the first data and matching a counting result with check data in the first data, whether the bits in the first data are changed may be determined.

During practical application, the master bus may be unstable due to accidental causes, thereby changing the first data transmitted on the master bus. In this case, it is still considered that normal communication can be carried out on the master bus. Therefore, when it is determined that the counting result does not match the check data, the check exception variable may be updated. Under the condition that the check exception variable is greater than a first threshold, it is indicated that the first data is frequently changed, and the master bus may undergo an exception, rather than being influenced by accidental causes. Therefore, it is determined that the check exception variable is in the exceptional state.

In another embodiment, under the condition that the bus variable is the type exception variable, the process of determining whether the bus variable is in the exceptional state includes the following operations 41 to 43.

In operation 41, type data of a frame type field is extracted from the first data.

In operation 42, the type exception variable is updated in response to determining that the type data does not belong to standard type data.

In operation 43, it is determined that the type exception variable is in the exceptional state when the type exception variable is greater than a second threshold.

The frame type field refers to a field for indicating a type of the first data, and specific data in the field is type data. The standard type data refers to legal data of the type field. Under the condition that the type data belongs to the standard type data, it is indicated that the type of the first data is legal and certain, and may be accurately identified. Similar to the situation described in the previous embodiment, since the master bus is affected by signal interference and other factors, data transmitted on the master bus may change, and bits in the data may be changed. Therefore, an even number of bits may be changed at the same time, which may involve the bits in the frame type field. The master bus may be unstable due to accidental causes, thereby changing the first data transmitted on the master bus. In this case, by comparing the type data with the standard type data, the type exception variable is updated under the condition that the type data does not belong to the standard type data. Under the condition that the type exception variable is greater than the second threshold, it is indicated that the master bus may undergo an exception, rather than being influenced by accidental causes. Therefore, it is determined that the type exception variable is in the exceptional state.

In another embodiment, when the bus exception condition is the data bus marker exception condition, the process of determining whether the first data satisfies the bus exception condition may include the following operations 51 and 52.

In operation 51, current bus marker data is extracted from the first data.

In operation 52, it is determined that the first data satisfies the data bus marker exception condition when the current bus marker data does not match the local bus data.

The local bus data refers to identity data of each target bus recorded by the controller. The first data may contain information of a master bus recorded by the controller that generates the first data. Since the controller may be sending data in a last round, the controller cannot tell whether an exception occurs on the master bus. Under the condition that the current bus marker data in the obtained first data is changed, it is indicated that other controllers have noticed that an exception occurs on the master bus recorded by the current controller. Therefore, monitoring results of the other controllers may be used to determine that an exception occurs on the master bus. That is, when the current bus marker data does not match the local bus data, it is determined that the first data satisfies the data bus marker exception condition.

In operation S103, in response to determining that the first data satisfies the bus exception condition, a target candidate bus in a healthy state is selected as a new master bus and local bus data is updated.

After it is determined that an exception occurs on the master bus, the target candidate bus in a healthy state may be used as a new master bus, and the local bus data may be updated. The target candidate bus is a candidate bus in a healthy state. After the two requirements are satisfied, any candidate bus may serve as the target candidate bus. Therefore, it can be understood that when a new master bus is selected, it is required to monitor a health state of each candidate bus. A specific method for monitoring a health state is not limited in the embodiments. For example, the local bus data may indicate a master bus identity, and further indicate a health state of each target bus. The target candidate bus may be determined by reading the local bus data.

In operation S104, a preset operation is carried out.

It should be noted that specific content of the preset operation is not limited in the embodiments. For example, in an embodiment, in response to determining that the first data does not satisfy the bus exception condition, the target data is written into a target caching location, for example, the above "receive buffer". In addition, after determining that the first data satisfies the bus exception condition, when there is no target candidate bus in the healthy state, the target caching location may be emptied and an exception is reported.

Figure 5:
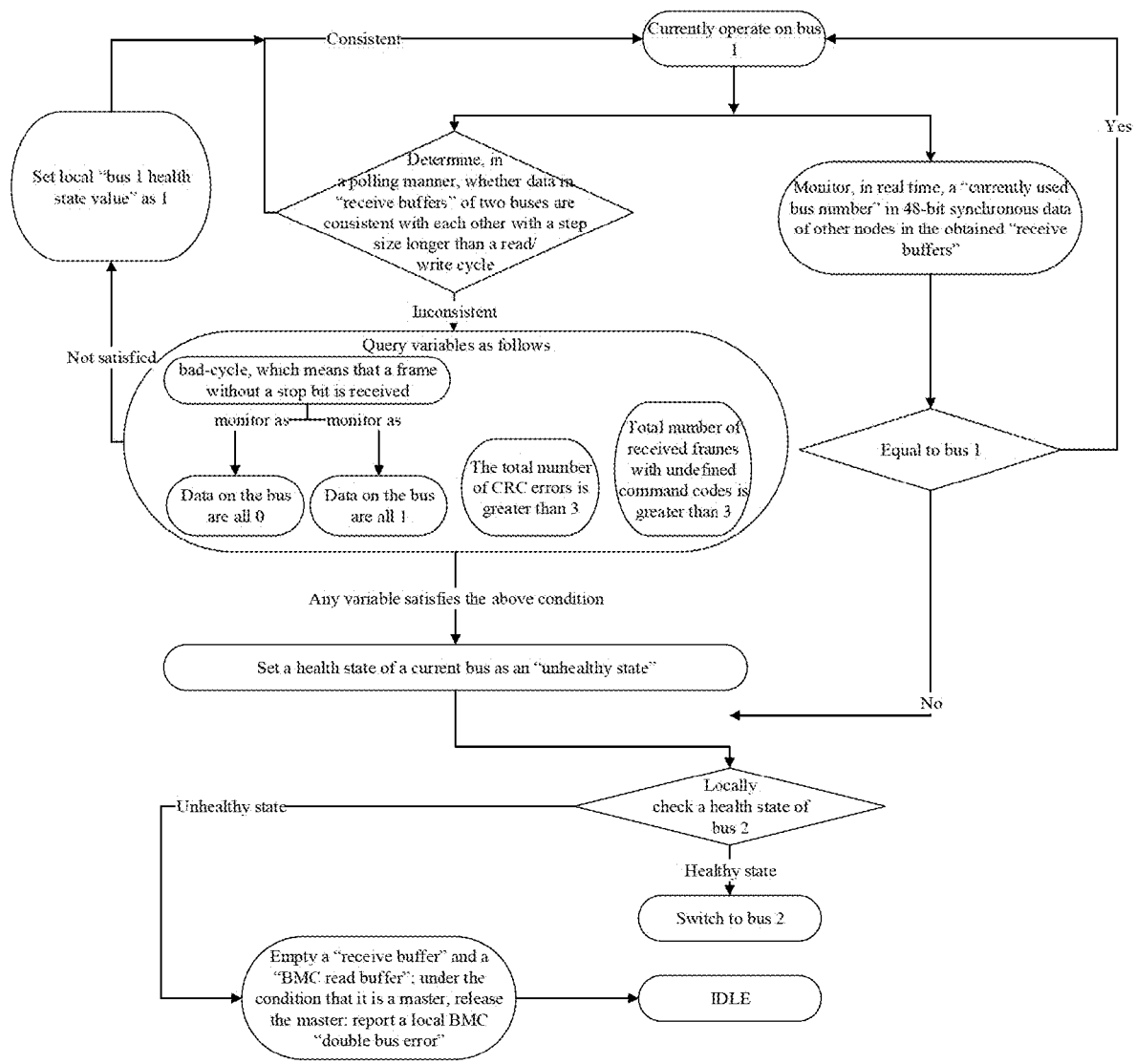
FIG. 5 is a flowchart of a bus exception handling method according to one or more embodiments of the present disclosure.

With reference to FIG. 5, a flowchart of a bus exception handling method according to one or more embodiments of the present disclosure is shown in FIG. 5. Further with the structure shown in FIG. 2 as an example, under the condition that the master bus is bus 1, during operation on bus 1, after the first data (that is, the data obtained on the "receive buffer", which is also 48-bit synchronous data of other nodes) is obtained, whether a "currently used bus number" (that is, current bus marker data) in the first data is equal to bus 1. If so, it is confirmed that no exception occurs; and if not, a health state of bus 2 is inquired. Under the condition that the health state of bus 2 is a healthy state, bus 2 is determined as a new master bus, that is, the master bus is switched from the old bus 1 to bus 2. Under the condition that the health state of bus 2 is an unhealthy state, the "receive buffer" and "BMC read buffer" are emptied. Under the condition that the current controller is a master controller, the current controller abandons the master controller identity, reports a "double bus error" to a local BMC, and enters an idle state.

In addition, after the first data is obtained, whether the first data is consistent with second data on bus 2 may be determined in a polling manner. Under the condition that the first data is inconsistent with the second data, whether an exception occurs on a variable is determined. The variable is a link exception variable, a check exception variable or a type exception variable. Under the condition that a bad-cycle is detected, that is, a data frame without a stop bit is received, bus 1 is monitored to determine whether the data on bus 1 are all zeros or all ones. Under the condition that the data on bus 1 are all zeros or all ones, it is determined that the condition is satisfied; otherwise, whether the total number (that is, a check exception variable) of CRC errors is greater than 3 is determined. Under the condition that the total number of CRC errors is greater than 3, it is determined that the condition is satisfied; otherwise, whether the total number (that is, a type exception variable) of received frames with undefined command codes is greater than 3 is determined. Under the condition that the total number of received frames with undefined command codes is greater than 3, it is determined that the condition is satisfied. Under the condition that none of the variables satisfies the condition, it is determined that no exception occurs on bus 1, and a local "bus 1 health state value" corresponding to bus 1 is set as 1, that is, a healthy state.

By using the bus exception handling method provided in the embodiments of the present disclosure, one master bus and one or more candidate buses are arranged between controllers, and data communication is carried out by means of the at least two buses. In the method, target data obtained from the master bus is referred to as first data, whether an exception occurs on the master bus may be determined according to the first data, that is, whether the first data satisfies a bus exception condition may be determined, so as to determine whether poor communication occurs during control. The bus exception condition may be a data bus marker exception condition, that is, whether an exception occurs on a bus marker in the first data may be determined; alternatively, the bus exception condition may be a data content exception condition, that is, whether an exception occurs on data content of the first data may be determined. Under the condition that any one of the above conditions is satisfied, it is indicated that the first data obtained from the master bus is not data sent by an original controller, and it may be further determined that an exception occurs on the master bus, which may lead to poor communication between controllers. In order to avoid "split-brain" of upper software or data inconsistency, after determining that the first data satisfies the bus exception condition, a target candidate bus in a healthy state is selected as a new master bus, such that the master bus is replaced. Moreover, the local bus data is updated, so as to indicate that an exception occurs on the old master bus. By changing a master bus identity, and selecting a healthy (that is, normal) target candidate bus as the new master bus, communication may be carried out always by means of a bus in a normal state. Therefore, smooth communication between controllers may be ensured, "split-brain" of the upper software may be avoided, and data consistency may be ensured.

It should be understood that although all operations in flowcharts are sequentially shown as indicated by arrows, these operations are not necessarily sequentially executed in orders indicated by the arrows. Unless explicitly stated herein, these operations are not strictly limited to orders in which they are executed, and these operations can be executed in other orders. Moreover, at least some operations in flowcharts can include a plurality of sub-operations or a plurality of stages. These sub-operations or stages are not necessarily executed at the same time, but can be executed at different times. These sub-operations or stages are not necessarily executed in sequence, but can be executed in turn or alternately with other operations or at least some sub-operations or stages of other operations.

The bus exception handling apparatus provided in the embodiments of the present disclosure is described below, and reference can be made to each other for the bus exception handling apparatus described below and the bus exception handling method described above.

Figure 6:
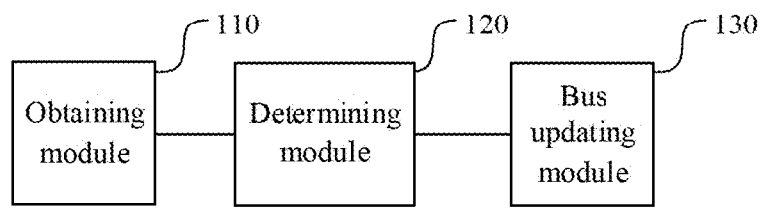
FIG. 6 is a schematic structural diagram of a bus exception handling apparatus according to one or more embodiments of the present disclosure.

With reference to FIG. 6, a schematic structural diagram of a bus exception handling apparatus according to one or more embodiments of the present disclosure is shown in FIG. 6. The apparatus includes:

an obtaining module 110, configured to respectively obtain, from multiple target buses, multiple pieces of target data corresponding to the multiple target buses, where the multiple target buses include a master bus and one or more candidate buses, and the target data corresponding to the master bus is referred to as first data;

a determining module 120, configured to determine whether the first data satisfies a bus exception condition, where the bus exception condition is a data bus marker exception condition or a data content exception condition; and a bus updating module 130, configured to, in response to determining that the first data satisfies the bus exception condition, select a target candidate bus in a healthy state as a new master bus and update local bus data.

In some exemplary embodiments, the determining module 120 includes:

a consistency determining unit, configured to determine whether the first data is consistent with target second data, where the one or more pieces of target data corresponding to the one or more candidate buses are referred to as second data, and the target second data is at least one piece of the second data;

a variable determining unit, configured to determine whether the bus variable is in an exceptional state under the condition that the first data is inconsistent with target second data; and a first exception determining unit, configured to determine that the first data satisfies the data content exception condition under the condition that the data content is in the exceptional state.

In some exemplary embodiments, the variable determining unit includes:

a monitoring sub-unit, configured to monitor the master bus for a preset duration to obtain a monitoring result, where the preset duration is longer than a single frame length; and a first determining sub-unit, configured to set a link exception variable in an exceptional state when the monitoring result is all zeros or all ones, and determine that the link exception variable is in the exceptional state.

In some exemplary embodiments, the variable determining unit includes:

a counting sub-unit, configured to count target bits in the first data to obtain a counting result; a first updating sub-unit, configured to update the check exception variable in response to determining that the counting result does not match check data in the first data; and a second determining sub-unit, configured to determine that the check exception variable is in the exceptional state when the check exception variable is greater than a first threshold.

In some exemplary embodiments, the variable determining unit includes:

an extracting sub-unit, configured to extract type data of a frame type field from the first data;

a second updating sub-unit, configured to update the type exception variable in response to determining that the type data does not belong to standard type data; and a third determining sub-unit, configured to determine that the type exception variable is in the exceptional state under the condition the check exception variable is greater than a second threshold.

In some exemplary embodiments, the determining module 120 includes:

a marker obtaining unit, configured to extract current bus marker data from the first data; and a second exception determining unit, configured to determine that the first data satisfies the data bus marker exception condition when the current bus marker data does not match the local bus data.

In some exemplary embodiments, the determining module further includes:

a writing module, configured to write the target data into target a caching location in response to determining that the first data does not satisfy the bus exception condition; and a reporting module, configured to, after determining that the first data satisfies the bus exception condition, empty the target caching location and report an exception when there is no target candidate bus in the healthy state.

The electronic device provided in the embodiments of the present disclosure is described below, and reference can be made to each other for the electronic device described below and the bus exception handling method described above.

The embodiments of the present disclosure further provide an electronic device. The electronic device includes a memory and one or more processors, where the memory stores a computer-readable instruction, and the computer-readable instruction enables the one or more processors to execute operations of the bus exception handling method in the above embodiments when executed by the one or more processors.

Figure 7:
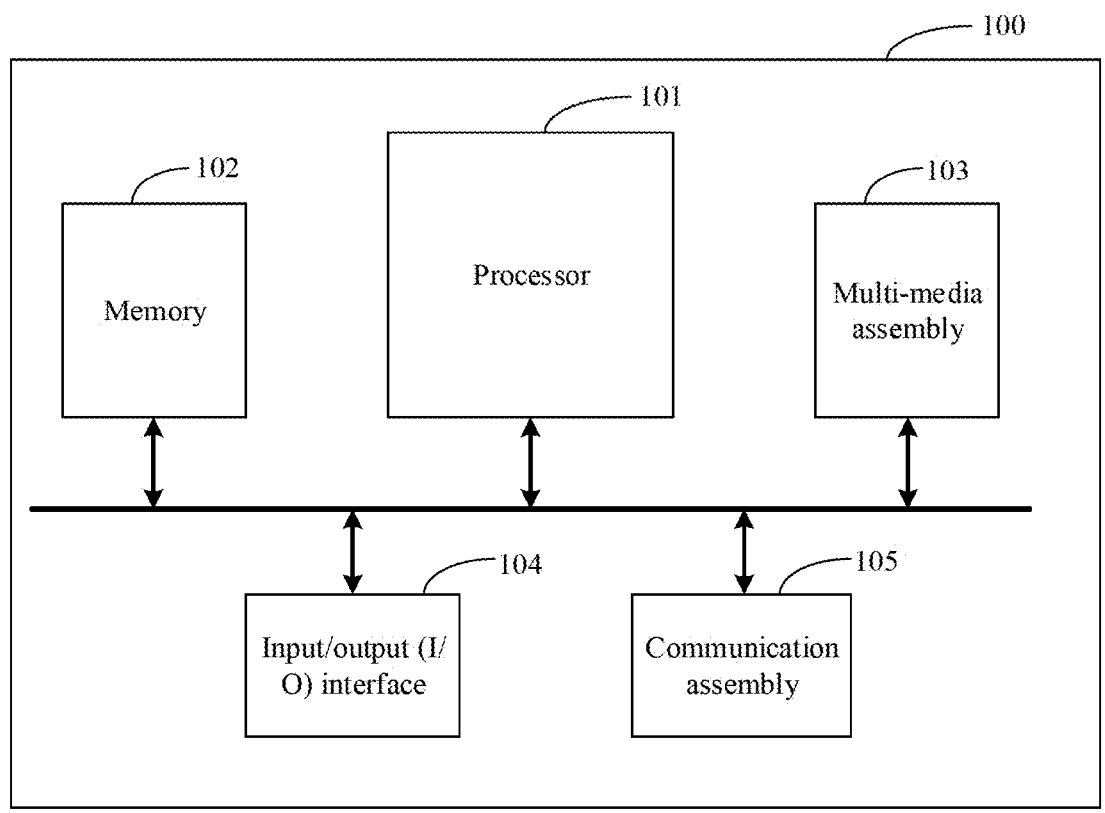
FIG. 7 is a schematic structural diagram of an electronic device according to one or more embodiments of the present disclosure.

With reference to FIG. 7, a schematic structural diagram of an electronic device according to one or more embodiments of the present disclosure is shown in FIG. 7. The electronic device 100 may include a processor 101 and a memory 102, and may further include one or more of a multi-media assembly 103, an information Input/Output (I/O) interface 104 and a communication assembly 105.

The processor 101 is configured to control overall operation of the electronic device 100, so as to complete all operations or some operations of the above bus exception handling method. The memory 102 is configured to store various types of data, so as to support operation of the electronic device 100. The data may include, for example, instructions for any applications or methods operating on the electronic device 100, as well as data related to the applications. The memory 102 may be implemented by any type of volatile or non-volatile memory devices or combinations thereof, for example, one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The multi-media assembly 103 may include a screen and an audio assembly. The screen may be, for example, a touch screen, and the audio assembly is configured to output and/or input audio signals. For example, the audio assembly may include a microphone for receiving external audio signals. The received audio signals may be further stored in the memory 102 or sent by means of the communication assembly 105. The audio assembly further includes at least one loudspeaker for outputting audio signals. The I/O interface 104 provides an interface between the processor 101 and other interface modules, for example, keyboards, mice and buttons. These buttons may be virtual buttons or physical buttons. The communication assembly 105 is configured to carry out wired or wireless communication between the electronic device 100 and other devices. Wireless communication may be, for example, Wi-Fi, Bluetooth, Near Field Communication (NFC), the second-generation wireless telephone technology (2G), the third-generation wireless telephone technology (3G) or the fourth-generation wireless telephone technology (4G), or a combination of one or more thereof, such that the corresponding communication assembly 105 may include: a Wi-Fi component, a Bluetooth component and an NFC component.

The electronic device 100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements, and is configured to execute the bus exception handling method provided in the above embodiments.

The computer-readable storage medium provided in the embodiments of the present disclosure is introduced below, and reference can be made to each other for the computer-readable storage medium described below and the bus exception handling method described above.

The embodiments of the present disclosure further provide one or more non-transitory computer-readable storage media storing a computer-readable instruction. The computer-readable instruction enables one or more processors to execute operations of the bus exception handling method in the above embodiment when executed by the one or more processors.

The computer-readable storage medium may include: a USB flash disk, a mobile hard disk, an ROM, a Random Access Memory (RAM), a diskette or optical disk, and other media which may store program codes.

The embodiments in the description are described in a progressive manner, each embodiment focuses on differences from other embodiments, and reference can be made to each other for the same and similar parts between the embodiments. Since an apparatus disclosed in an embodiment corresponds to a method disclosed in another embodiment, the description is relatively simple, and reference can be made to the description of the method for relevant parts.

Those having ordinary skill in the art should be able to further realize that operations of a unit and an algorithm of each instance described in combination embodiments disclosed herein can be implemented by electronic hardware, computer software or a combination of the two. In order to clearly illustrate interchangeability of hardware and software, compositions and operations of each instance have been generally described in terms of functionality in the above description. Whether these functions are executed by hardware or software depends on specific application and design constraints of the technical solution. Those having ordinary skill in the art can use different methods to implement the described functions for specific application, but such implementation should not be considered to be beyond the scope of the present disclosure.

Operations of a method or algorithm described in combination with embodiments disclosed herein can be implemented directly by hardware, a software module executed by a processor or a combination of the two. The software module can be placed in an RAM, a memory, an ROM, an electrically programmable ROM, an electrically erasable programmable ROM, a register, a hard disk, a removable disk, a Compact Disk Read-Only Memory (CD-ROM) or storage media in any other forms known in the art.

At last, it should be noted that relational terms such as first and second herein are merely used to distinguish one entity or operation from another entity or operation without certainly requiring or implying any such actual relation or order between such entities or operations. In addition, terms "include" and "comprise" or their any other variations are intended to cover non-exclusive inclusions, such that a process, method, article or device including a series of elements not only includes those elements, but also includes other elements that are not explicitly listed, or further includes inherent elements of the process, method, article or device.

Specific instances are used herein for illustrating principles and embodiments of the present disclosure. The description of the above embodiments is merely used to help in understanding the method of the present disclosure and its core ideas. Moreover, those having ordinary skill in the art can make various modifications in terms of exemplary embodiments and the scope of application in accordance with the ideas of the present disclosure. In conclusion, the content of the description should not be understood as limiting the present disclosure.

What is claimed is:

1. A bus exception handling method, comprising:
respectively obtaining, from multiple target buses, multiple pieces of target data corresponding to the multiple target buses, wherein the multiple target buses comprise a master bus and one or more candidate buses, and the target data corresponding to the master bus is referred to as first data;
determining whether the first data satisfies a bus exception condition, wherein the bus exception condition is a data bus marker exception condition or a data content exception condition; and
in response to determining that the first data satisfies the bus exception condition, selecting a target candidate bus in a healthy state as a new master bus and updating local bus data; wherein
when the bus exception condition is the data bus marker exception condition, determining whether the first data satisfies the bus exception condition comprises:
extracting current bus marker data from the first data; and
determining that the first data satisfies the data bus marker exception condition when the current bus marker data does not match the local bus data.

2. The bus exception handling method according to claim 1, wherein when the bus exception condition is the data content exception condition, determining whether the first data satisfies the bus exception condition comprises:
determining whether the first data is consistent with target second data, wherein the one or more pieces of target data corresponding to the one or more candidate buses are referred to as second data, and the target second data is at least one piece of the second data;
in response to determining that the first data is inconsistent with the target second data, determining whether a bus variable is in an exceptional state; and
determining that the first data satisfies the data content exception condition when the bus variable is in the exceptional state.

3. The bus exception handling method according to claim 2, wherein the bus variable is a link exception variable, and determining whether the bus variable is in the exceptional state comprises:
monitoring the master bus for a preset duration to obtain a monitoring result, wherein the preset duration is longer than a single frame length; and
determining that the link exception variable is in the exceptional state when the monitoring result is all zeros or all ones.

4. The bus exception handling method according to claim 2, wherein the bus variable is a check exception variable, and determining whether the bus variable is in the exceptional state comprises:
counting target bits in the first data to obtain a counting result;
updating the check exception variable in response to determining that the counting result does not match check data in the first data; and
determining that the check exception variable is in the exceptional state when the check exception variable is greater than a first threshold.

5. The bus exception handling method according to claim 2, wherein the bus variable is a type exception variable, and determining whether the bus variable is in the exceptional state comprises:

extracting type data of a frame type field from the first data;
updating the type exception variable in response to determining that the type data does not belong to standard type data; and
determining that the type exception variable is in the exceptional state when the type exception variable is greater than a second threshold.

6. The bus exception handling method according to claim 1, further comprising:
writing the target data into a target caching location in response to determining that the first data does not satisfy the bus exception condition; and
after determining that the first data satisfies the bus exception condition, emptying the target caching location and reporting an exception when there is no target candidate bus in the healthy state.

7. An electronic device, comprising a memory and one or more processors, wherein the memory stores a computer-readable instruction, and the computer-readable instruction enables the one or more processors to execute following operations when executed by the one or more processors:
respectively obtaining, from multiple target buses, multiple pieces of target data corresponding to the multiple target buses, wherein the multiple target buses comprise a master bus and one or more candidate buses, and the target data corresponding to the master bus is referred to as first data;
determining whether the first data satisfies a bus exception condition, wherein the bus exception condition is a data bus marker exception condition or a data content exception condition; and
in response to determining that the first data satisfies the bus exception condition, selecting a target candidate bus in a healthy state as a new master bus and updating local bus data; wherein
when the bus exception condition is the data bus marker exception condition, determining whether the first data satisfies the bus exception condition comprises:
extracting current bus marker data from the first data; and
determining that the first data satisfies the data bus marker exception condition when the current bus marker data does not match the local bus data.

8. One or more non-transitory computer-readable storage media storing a computer-readable instruction, wherein the computer-readable instruction enables one or more processors to execute following operations when executed by the one or more processors:
respectively obtaining, from multiple target buses, multiple pieces of target data corresponding to the multiple target buses, wherein the multiple target buses comprise a master bus and one or more candidate buses, and the target data corresponding to the master bus is referred to as first data;
determining whether the first data satisfies a bus exception condition, wherein the bus exception condition is a data bus marker exception condition or a data content exception condition; and
in response to determining that the first data satisfies the bus exception condition, selecting a target candidate bus in a healthy state as a new master bus and updating local bus data; wherein
when the bus exception condition is the data bus marker exception condition, determining whether the first data satisfies the bus exception condition comprises:
extracting current bus marker data from the first data; and
determining that the first data satisfies the data bus marker exception condition when the current bus marker data does not match the local bus data.

9. The bus exception handling method according to claim 1, wherein the target data is a data synchronization broadcast command, data content of which is data to be synchronized; or a request synchronization command, data content of which is unique identity information of a designated node; or taking leadership information for competing for a master node identity.

10. The bus exception handling method according to claim 9, wherein the taking leadership information is sent on each of the multiple target buses by each CPLD in a following manner:
when detecting that a current bus does not have a master, starting, by each CPLD, a first timer;
after timing of the first timer is over, sending, by the CPLD, a taking leadership command on each of the multiple target buses, and starting, by the CPLD, a second timer;
when determining that no bus is in a non-idle state during timing of the second timer, determining, by the CPLD, that taking leadership succeeds, and sending, by the CPLD, a taking leadership succeeds command.

11. The bus exception handling method according to claim 10, wherein detecting that the current bus does not have a master comprises:
when a CPLD detects that a serial clock line or a serial data line of current bus has a level change, determining, by the CPLD, that the bus is in a non-idle state; and
when the non-idle state lasts for more than a predefined duration, determining, by the CPLD, that the current bus does not have a master.

12. The bus exception handling method according to claim 10, wherein time of the first timer is determined according to a node code of the CPLD, and time of the second timer is determined according to the node code of the CPLD.

13. The bus exception handling method according to claim 12, wherein the time of the first timer is equal to node code * a, and the time of the second timer is equal to node code * b, wherein a is a first time length, b is a second time length, and a is larger than b.

14. The bus exception handling method according to claim 9, wherein the data synchronization broadcast command is sent on each of the multiple target buses by each controller in a following manner:
sending, by a master controller, an upload broadcast command;
in response to the upload broadcast command, obtaining, by all controllers, their respective synchronization data collected by their respective receive buffers, and updating, by all the controllers, the synchronization data into their respective BMC read buffers;
sending, by the master controller, a data synchronization broadcast command to broadcast key information of a controller motherboard of the master controller, and storing, by all the controllers, the key information into their respective receive buffers; and
sending, by each controller other than the master controller in response to a request synchronization broadcast command, a data synchronization broadcast command to broadcast key information of a controller motherboard of the controller, and storing, by all the controllers, the key information into their respective receive buffers.

15. The bus exception handling method according to claim 9, wherein the request synchronization broadcast command is sent on each of the multiple target buses in a following manner:
- after a master controller sends a data synchronization broadcast command to broadcast key information of a controller motherboard of the master controller, sending, by the master controller, the request synchronization broadcast command and entering, by the master controller, a passive monitoring state.

16. The bus exception handling method according to claim 1, wherein the data bus marker exception condition refers to a condition indicating that an exception occurs on a bus marker in the first data; and the data content exception condition refers to a condition indicating that an exception occurs on data content of the first data.

17. The bus exception handling method according to claim 1, wherein the local bus data indicates a master bus identity and a health state of each target bus.

18. The bus exception handling method according to claim 17, wherein selecting the target candidate bus in the healthy state as the new master bus comprises:
- reading the local bus data; and
- selecting, according to the local bus data, the target candidate bus in the healthy state as the new master bus.

19. The electronic device according to claim 7, wherein when the bus exception condition is the data content exception condition, determining whether the first data satisfies the bus exception condition comprises:
- determining whether the first data is consistent with target second data, wherein the one or more pieces of target data corresponding to the one or more candidate buses are referred to as second data, and the target second data is at least one piece of the second data;
- in response to determining that the first data is inconsistent with the target second data, determining whether a bus variable is in an exceptional state; and
- determining that the first data satisfies the data content exception condition when the bus variable is in the exceptional state.

20. The electronic device according to claim 19, wherein the bus variable is a link exception variable, and determining whether the bus variable is in the exceptional state comprises: monitoring the master bus for a preset duration to obtain a monitoring result, wherein the preset duration is longer than a single frame length; and determining that the link exception variable is in the exceptional state when the monitoring result is all zeros or all ones;

or, the bus variable is a check exception variable, and determining whether the bus variable is in the exceptional state comprises: counting target bits in the first data to obtain a counting result; updating the check exception variable in response to determining that the counting result does not match check data in the first data; and determining that the check exception variable is in the exceptional state when the check exception variable is greater than a first threshold;

or, the bus variable is a type exception variable, and determining whether the bus variable is in the exceptional state comprises: extracting type data of a frame type field from the first data; updating the type exception variable in response to determining that the type data does not belong to standard type data; and determining that the type exception variable is in the exceptional state when the type exception variable is greater than a second threshold.

* * * * *